Figure 1:
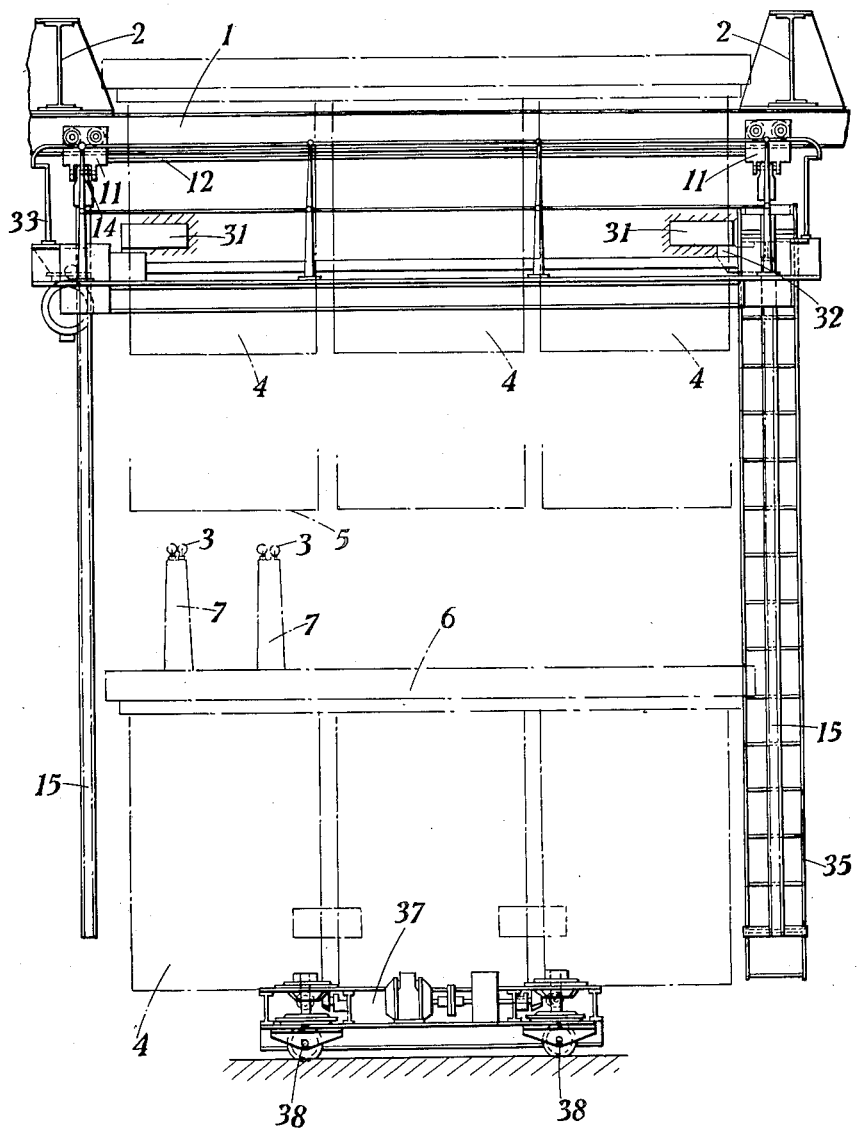

Jan. 1, 1935.　　C. C. GARRARD ET AL　　1,985,984
ELECTRIC SWITCH GEAR
Filed July 21, 1933　　6 Sheets-Sheet 1

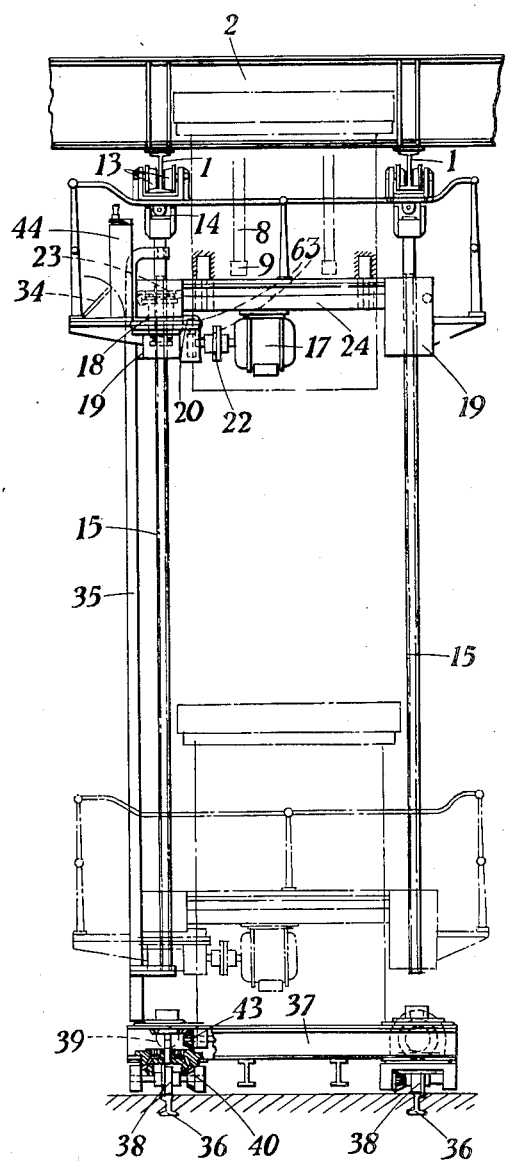

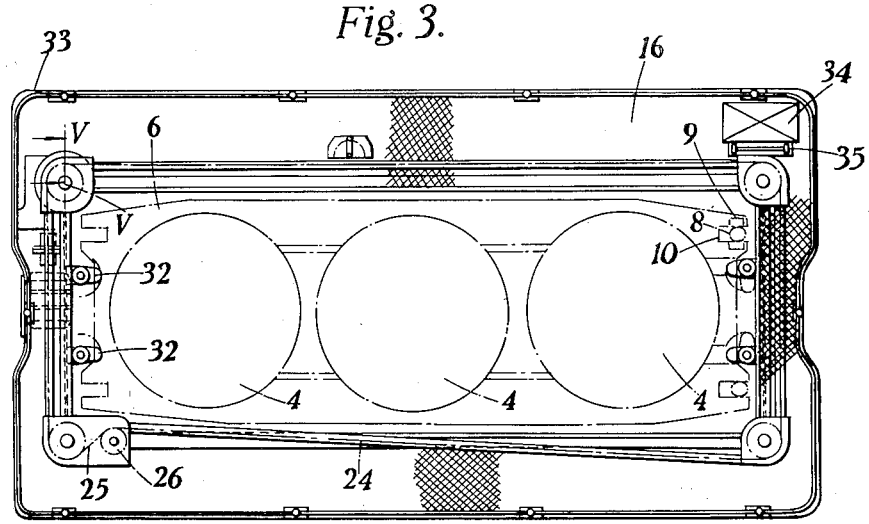
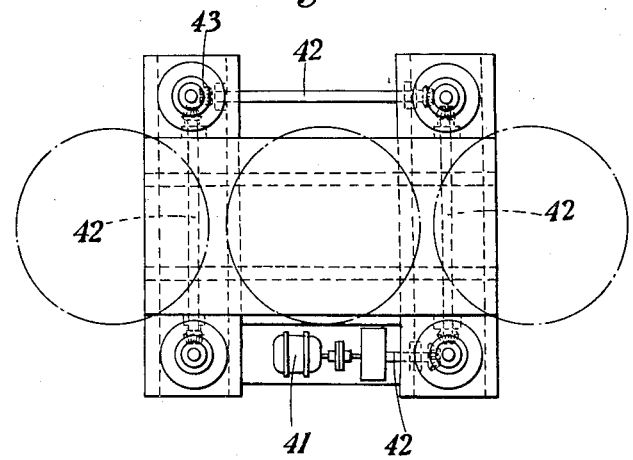

Jan. 1, 1935. C. C. GARRARD ET AL 1,985,984
ELECTRIC SWITCH GEAR
Filed July 21, 1933  6 Sheets-Sheet 4
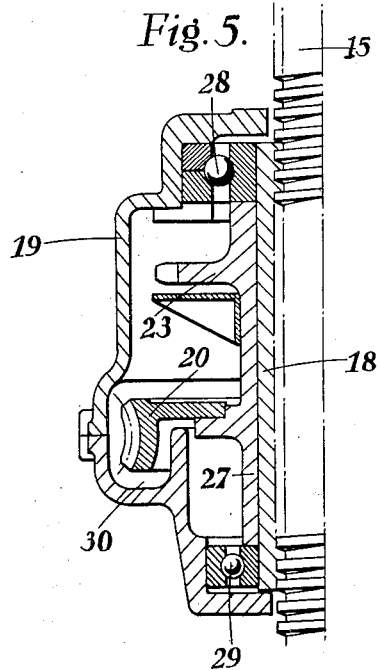
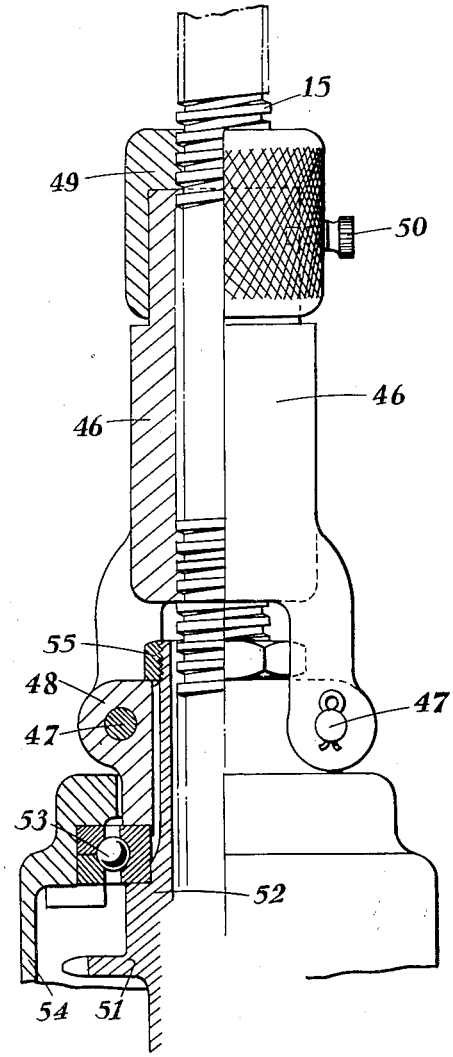
INVENTORS
Charles C. Garrard
and Frederick J. Keeley
BY
M. H. Lockwood
ATTORNEY

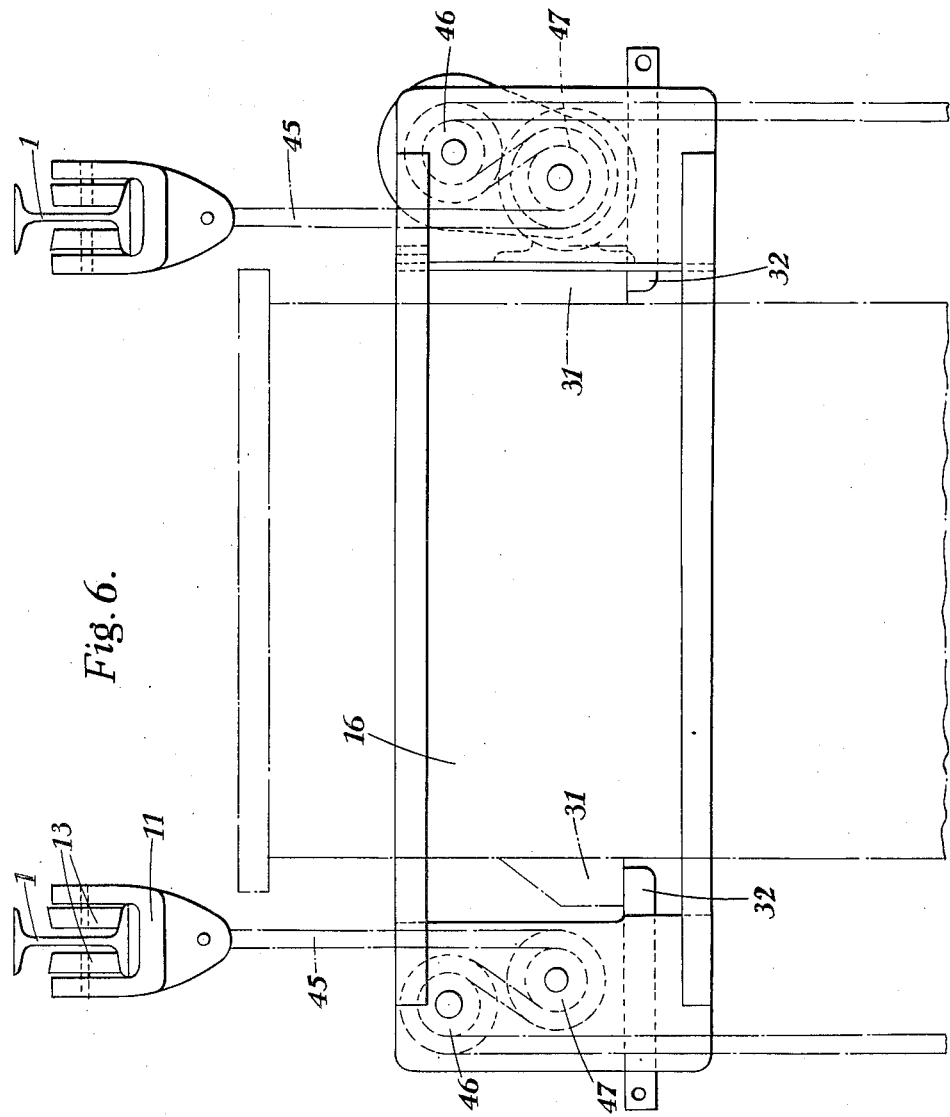

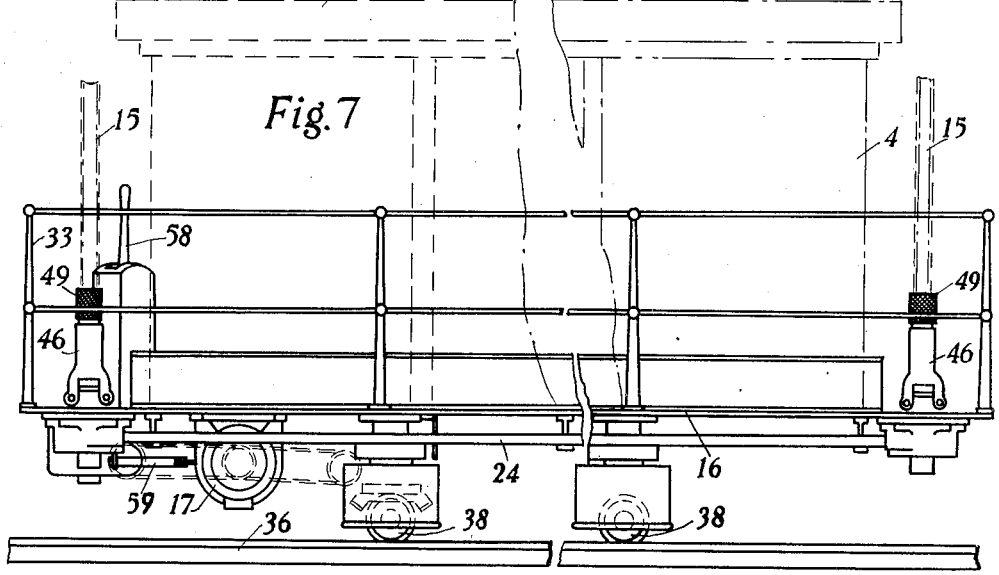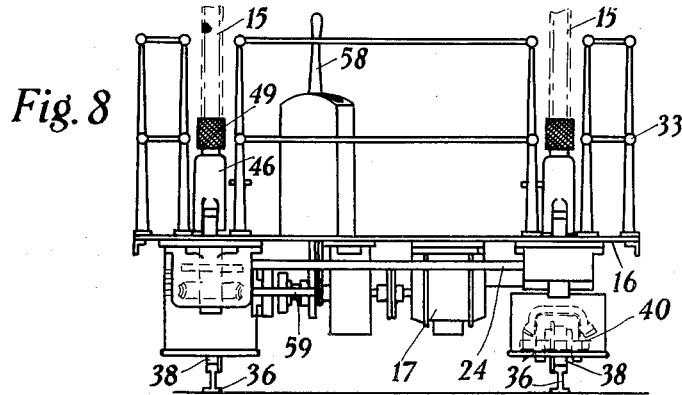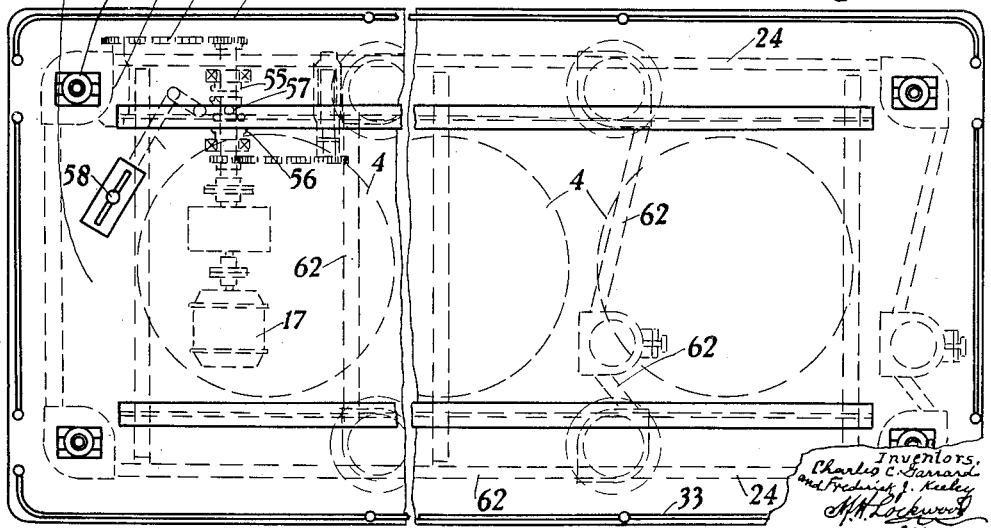

Patented Jan. 1, 1935

1,985,984

UNITED STATES PATENT OFFICE 1,985,984

ELECTRIC SWITCH GEAR

Charles Cornfield Garrard, Sutton Coldfield, Birmingham, and Frederick Joseph Keeley, Streetly, Birmingham, England, assignors to The General Electric Company Limited, London, England Application July 21, 1933, Serial No. 681,550
In Great Britain July 26, 1932

5 Claims. (Cl. 175—298)

This invention relates to electric switchgear and particularly to groups of vertically withdrawable electric switches. In such switchgear it is desirable that raising and lowering means should be provided for withdrawing a switch for the purpose of isolating it or changing its position or repairing or replacing the switch. The object of the invention is to provide an improved form of common raising and lowering means for a group of switches, which means are simple and compact and at the same time of robust construction.

A switchgear arrangement, according to the present invention, comprises a number of downwardly withdrawable electric switches, an overhead track and common raising and lowering means for the switches, one part of which means is adapted to travel along the track to various operating positions adjacent to the respective switches and a second part of which means is adapted to be suspended from the first part.

The said second part of the raising and lowering means may be suspended from the first part by tension members and be adapted to ascend or descend the said members to raise or lower the switches. Thus the said tension members may be screw threaded and carry nuts which support the said second part of the raising and lowering means and means may be provided for rotating the nuts simultaneously to raise and lower the second part of the raising and lowering means. The said nuts may conveniently be rotated simultaneously by an endless chain or like flexible member. Furthermore the said tension members may be connected to the said first part of the raising and lowering means through universal joints. In an alternative arrangement the tension members comprise chains or like flexible members.

A transporting truck may be arranged to travel below the said second part of the raising and lowering means to receive a switch lowered by the raising and lowering means or to move a switch to a position from which the said means may raise the switch to its operative position. Alternatively the said second part of the raising and lowering means may comprise a transporting truck arranged with or without rails to run on the floor or ground; the transporting truck is preferably adapted to be disconnected from the said first part of the raising and lowering means.

The invention will now be described, by way of example, with reference to the accompanying partly diagrammatic drawings of switchgear arrangements in accordance with the invention. Figures 1 and 2 are a side elevation and end elevation respectively of the raising and lowering means; Figure 3 is a plan view of the suspended part of the raising and lowering means; Figure 4 is a plan view of the transporting truck; Figure 5 is a section on an enlarged scale on the line V—V of Figure 3 showing one of the nuts; Figure 6 shows a method of suspending part of the raising and lowering means on chains; Figures 7, 8 and 9 are a side elevation, end elevation, and plan view respectively of a modified form of suspended part of the raising and lowering means; Figure 10 is a side elevation in half section of a modified form of nut which is adapted to be rapidly disconnected from its spindle.

With reference to Figures 1, 2, 3, 4 and 5 of the drawings the overhead track comprises a pair of I joists 1 mounted beneath cross members 2, which are supported by uprights (not shown). In order to simplify the drawings the switches have been shown entirely diagrammatically and the bus bars have been omitted altogether. As far as an understanding of the present invention is concerned, it will suffice to say that the bus bars are mounted in known manner above the cross members 2 and extend parallel with the joists 1. The bus bar coupling sockets and the feeder coupling sockets extend downwards below the bus bars and are adapted to be engaged by plugs such as 3 of downwardly withdrawable switches. A single set only of three switches, associated with the three phases of a single feeder, is shown in the drawings, but it will be understood that the sets of switches associated with other feeders are arranged together with the set shown in a continuous line and the joists 1 extend along this line to enable the raising and lowering means to be moved from one set of switches to another. The switches are shown in chain dotted line in their fully lowered positions and also in their fully raised or operative position, whilst an intermediate positon is indicated at 5 in which the switches are in their isolating position 2.

The set of three switches comprises a top plate 6, on which the plugs 3 (the plugs are shown for one switch only) are mounted on bushes 7, and three tanks 4 containing the oil immersed switches. The tanks 4 are secured together but may be detached from the top plate 6 in known manner to expose the switch contacts. When the switches are in the isolating position the top plate 6 may be supported from rods 8 (the rods are shown at one end only) by stops 9 secured to the ends of the rods and adapted to engage the plate 6 adjacent to slots 10, through which the rods pass. The tanks 4 can then be released from the plate 6 and further lowered to expose the switch contacts. To release the plate 6 from the rods 8 it is only necessary to rotate the stops 9 through a right angle and allow them to pass through the slots 10.

The part of the raising and lowering means which is adapted to travel along the overhead track comprises a two part bogey. Each part of the bogey includes two blocks 11 connected together and spaced apart by a rod 12. Each block carries on upwardly extending side members two pairs of wheels 13; these wheels 13 engage the bottom flanges of the joists 1. Suspended from each block 11 through a double hinged universal joint 14 is a long threaded spindle 15: the spindles are disposed clear of the sides of the switch tanks.

Supported from the four spindles 15 is a platform 16 that serves not only as part of the raising and lowering means, but also facilitates inspection and attention of the switches with which the platform is for the time being associated. The platform 16 is connected at its four corners to the spindles 15 by means of four nuts in the form of threaded sleeves 18, which engage the threads on the four spindles 15. Each sleeve 18 is rotatably mounted in a casing 19 secured to the platform 16, so that by rotating the four sleeves simultaneously the platform 16 can be raised up or lowered down the spindles 15.

The sleeves 18 are rotated by a motor 17 mounted on the underside of the platform 16. The motor 17 drives through a clutch 22 and gearing 63 a worm which meshes with a worm wheel 20 secured to one of the sleeves 18, this sleeve 18 can thus be driven by the motor at a reduced rate. Secured to each sleeve 18 is a chain sprocket 23 and the four sprockets are connected together by an endless driving chain 25 arranged in a pipe 24, so that the four sleeves 18 are rotated simultaneously by the motor 17; a jockey pulley 26 is provided for adjusting the tension of the chain. The motor 17 is controlled by a controller 44.

The mounting of the sleeve 18 in the casing 19 is more clearly shown in Figure 5. As there shown the worm wheel 20 and chain sprocket 23 are mounted on a hub 27, to which is splined the sleeve 18; the sleeve 18 is made of bronze. The top end of the sleeve 18 is mounted in a combined thrust and journal bearing 28 and the bottom end of the sleeve 18 is mounted in a journal bearing 29. The casing 19 is formed with a channel 30 into which the periphery of the worm wheel 20 projects; this channel is filled with oil which serves to lubricate the worm gearing. The other sleeves 18 are similar to that shown in Figure 5, except that they are not provided with worm wheels 20.

The platform 16 is provided with a central aperture through which the set of switches can pass and in Figure 3 the switch tanks 4 and top plate 6 are shown in chain dotted line in the aperture. The two end switch tanks have lugs 31 welded on to their sides, whilst members 32 are pivotally mounted on the platform 16 so that they can be rotated to an operative position in which they project into the aperture and engage the under side of the lugs 31. The platform includes a gangway extending right round the periphery thereof and provided with railings 33. Access to the platform when elevated may be had by means of a trapdoor 34 in the platform floor and a ladder 35 secured to the top and bottom of one of the spindles 15.

Arranged to run beneath the switches on rails 36 is a transporting truck 37 provided with wheels 38. Each wheel 38 is driven from a vertical spindle 39 through bevel gearing 40 and each spindle 39 is driven from a motor 41 through horizontal shafts 42 and bevel gearing 43.

When it is desired to lower a set of switches the bogey is moved along the overhead track to the set of switches which is to be lowered. The bogey may conveniently be moved by lowering the platform 16 on to the transporting truck 37 and driving the truck, and with it the platform and bogey, by means of the motor 41. The members 32 are then rotated to their operative position and the platform is raised, so that the lower ends of the tanks 4 project through the aperture in the platform 16, until the members 32 engage the lugs 31. The set of switches is then released so that it is supported by the members 32 and the platform is lowered to lower the switches to the desired positions. If it is desired to remove the set of switches altogether the set is lowered on to the truck 37, the members 32 are rotated clear of the lugs 31, the platform is raised clear of the set of switches and the set of switches is driven away on the truck 37. In Figure 4 a set of switches is shown in chain dotted line resting on the truck 37. The method of returning the set of switches to its operative position will be evident from the above description.

In order to ensure correct positioning of the platform below a set of switches, downwardly extending pointed guide rods (not shown) may be secured to the structure supporting the switches, whilst the platform 16 may be provided with corresponding holes through which the rods can slide when the platform is raised in its correct position. Then if the platform is approximately positioned below a set of switches and raised, the pointed ends of the rods will engage the holes and accurately position the platform. Owing to the universal joints 14 the platform can be moved sideways, if necessary, to enable it to engage a lowered set of switches which are not accurately positioned, then as the platform is raised, provided the bogey is in its correct position, the set of switches is automatically swung into its correct position below its sockets.

It will be seen that when a set of switches is being raised and lowered they are supported entirely by the bogey, but when the bogey is correctly positioned the wheels 13 engage the joists 1 at points below the cross beams 2 so that stresses are not set up in the joists due to bending of the joists. Furthermore since the platform 16 is freely suspended by the spindles 15, tensile stresses alone are set up in the spindles so that bending moments are avoided.

Instead of moving the bogey along its track by means of the truck 37, the bogey may be provided with a separate driving motor.

In a modified arrangement chains are substituted for the spindles 15. One method by which the platform 16 may be supported from chains is illustrated in Figure 6. Parts which correspond to the parts in the above described arrangement are similarly numbered. As shown a chain 45 is suspended from each block 11. Each chain 45 passes round a pair of chain sprockets 46 and 47, the top sprockets 46 being driving sprockets. The driving sprockets 46 may be rotated together in any convenient manner, for example the two sprockets 46 on either side of the platform 16 may be both mounted on the same horizontal shaft, whilst the two shafts may be geared together by a cross shaft and bevel gearing and driven by a motor mounted on the platform 16. In the arrangement shown in Figure 6 the lugs 31 are welded to the sides of the tank and the members 32 which engage them comprise sliding dogs, which may be slid horizontally into or out of engagement with the lugs 31.

The arrangement shown in Figures 1, 2, 3, 4 and 5 can be modified as shown in Figures 7, 8 and 9 by combining the platform 16 and the transporting truck. Thus the platform 16 is provided with wheels so that it can travel along the rails 36. In this modification the motor 17 which rotates the sleeves about the spindles 15 can be used to effect movement of the platform along the rails 36. For this purpose a double clutch arrangement 55, 56, 57 is provided on the platform. When the platform is required to be raised or lowered then the clutch members 55 and 57 are brought into engagement by means of the lever and link members 58 and 59 a continuous chain in pipes 24 being moved through the chain 60 and gearing 61. When the platform is required to be driven along the rails 36, the clutch members 56 and 57 are brought into engagement and the wheels 38 are rotated by bevel gearing 40 moved by a continuous chain in pipes 62.

It is desirable, in the modified arrangement, that the nuts by which the platform is secured to the spindles 15 should be readily detachable so that the platform can be moved laterally independently thereof. For this purpose the nuts may take the form shown in Figure 10.

As shown the nut is in the form of a screw threaded sleeve made in two halves 46, each of which are pivoted at 47 to an annular member 48. The two halves 46 can thus be rotated towards one another to embrace the spindle 15 as shown in the figure. The two halves are held in this position by means of a collar 49 which is threaded on the spindle 15 and embraces the ends of the half sleeves 46. The outer surface of the collar 49 is knurled to provide a hand grip and is provided with a locking screw 50.

A chain sprocket 51 is mounted on a hollow hub 52 which is rotatably mounted in a casing 54 on combined thrust and journal bearings 53 at its upper end and on journal bearings (not shown) at its lower end: the casing 54 is mounted on the platform 16. The internal bore of the hub 52 is slightly greater than the diameter of the spindle 15. The member 48 is splined to the hub 52 and retained in position by a lock nut 55. The sprocket 51 corresponds to the sprocket 23 in Figure 5 and may be rotated in a similar manner by means of an endless chain to raise and lower the platform 16.

In operation, when the platform 16 has been lowered into engagement with the rails 36, the end of the spindle 15 is flush with the bottom of the two halves 46 of the sleeve. So that in this position the locking screw 50 can be unscrewed, the collar 49 screwed up the spindle 15 to release the two half sleeves 46, the sleeve opened out flat by rotating the two halves 46 outwards to release the spindle 15, the clutch member 58 moved so that members 55 and 57 engage and the platform driven away.

If desired the sleeve may be made in one piece and detached from the platform instead of from the spindle. For example the sleeve may be bolted to the member 48 and unbolted therefrom to detach the platform.

We claim:—

1. In a switchgear arrangement comprising a plurality of downwardly withdrawable electric switches, raising and lowering means for said switches, comprising an elevated track, means for supporting the track, travelling means arranged to move along said track to different operative positions relative to the switches, a plurality of tension members extending downwardly from said travelling means, a platform arranged to be supported by said tension members, means carried by said platform for supporting the switches, and means disposed on the platform and cooperating with said tension members for raising and lowering said platform relatively to the travelling means.

2. In a switchgear arrangement comprising a plurality of downwardly withdrawable electric switches, common raising and lowering means for the switches comprising an overhead track, means for supporting the track, travelling means arranged to travel along said track to different operative positions relative to the switches, a plurality of screw threaded spindles suspended from said travelling means on opposite sides of the switches, supporting means for the switches, a plurality of nuts rotatably mounted on said switch supporting means and engaging the threads on the spindles and means for rotating said nuts simultaneously to move the switch supporting means up and down the spindles.

3. In a switchgear arrangement comprising a plurality of downwardly withdrawable electric switches, common raising and lowering means for the switches comprising an overhead track, means for supporting the track, means arranged to travel along said track to different operative positions relative to the switches, means for supporting the switches, means for suspending said switch supporting means from said travelling means, means for detachably connecting the switch supporting means to said suspending means and means for operating said connecting means for raising and lowering said switch supporting means relatively to the travelling means, said detachable connecting means permitting separation of said switch supporting means from said travelling means.

4. In a switchgear arrangement comprising a plurality of downwardly withdrawable electric switches, common raising and lowering means for the switches comprising an overhead track, means for supporting said track, travelling means arranged to travel along the track, a plurality of screw threaded spindles extending downward from said travelling means, switch supporting means provided with independent transporting means, a plurality of split nuts rotatably mounted on said switch supporting means and held in engagement with the respective spindles, means for rotating said nuts simultaneously to move them along the spindles for raising and lowering said switch supporting means relative to said travelling means, and means for releasing said split nuts from the spindles for transportation of said switch supporting means by said independent transporting means.

5. In a switchgear arrangement comprising a plurality of downwardly withdrawable electric switches, common raising and lowering means for the switches comprising an overhead track, means for supporting the overhead track, travelling means arranged to travel along the track to different operative positions relative to the switches, a plurality of chains hanging from said travelling means, switch supporting means arranged to be supported by said chains, a plurality of toothed wheels mounted on the switch supporting means and engaging said chains and means for rotating said toothed wheels simultaneously to raise and lower the switch supporting means.

CHARLES CORNFIELD GARRARD.
FREDERICK JOSEPH KEELEY.